Feb. 10, 1970 G. CLIFT ET AL 3,495,271

DATA TRANSCRIBING MECHANISM

Filed Oct. 24, 1967 2 Sheets-Sheet 1

Gilbert Clift

Christopher E. Smith

INVENTORS

BY Michael P. Breston

ATTORNEY

Gilbert Clift
Christopher E. Smith
INVENTORS

BY Michael P. Breston

ATTORNEY

United States Patent Office 3,495,271
Patented Feb. 10, 1970

3,495,271
DATA TRANSCRIBING MECHANISM

Gilbert Clift and Christopher E. Smith, Houston, Tex., assignors to Geo Space Corporation, Houston, Tex., a corporation of Texas Filed Oct. 24, 1967, Ser. No. 677,544
Int. Cl. G01d 15/24
U.S. Cl. 346—138 5 Claims

ABSTRACT OF THE DISCLOSURE

A data translating machine which includes a rotatable drum and a member rotatably disposed within the drum. The member is typically a cartridge of photographic film which defines at its end a shoulder. A latch is rotatably supported on the drum and is abuttingly positioned next to the shoulder for causing the film to load and unload the drum.

BACKGROUND OF THE INVENTION

The present invention pertains to data transcribing machines such as those of the image and/or facsimile reproducing variety. It more particularly is directed to image and/or facsimile reproducing systems in which a rotating drum is utilized to carry a photosensitive paper, film, or other transcribing medium before a transducer means such as an energy source while the transducer means is moved longitudinally parallel to the axis of the drum.

Image and/or facsimile reproducers of the rotating drum variety have heretofore been characterized by a number of cumbersome operating features making them unattractive to many potential users. One of these pertains to the utilization of the reproducing system with present day computers wherein it is desirable to interface the reproducing system with the computer so that information can be fed directly to the system. Due to the relatively slow facsimile reproducing rate of image reproducers heretofore, substantial down time is necessitated on the computer since the reproducer is unable to accept the information as quickly as it is presented. A further disadvantage of presently known reproducing devices is their inability to be loaded and unloaded in a lighted room or even in a partially lighted room due to the possibility of exposure of the light sensitive medium. As a consequence, prior art devices were necessarily loaded in darkness or partial darkness, thus making the loading and unloading cumbersome and time consuming. In addition, numerous problems were presented such as alignment of recording medium within the data transcribing machine, connection of the film to the rotating drum assembly, potential exposure of the light sensitive medium even after the cartridge was removed from the drum assembly of the machine, and the necessity to design specific data transcribing machines for each of numerous applications.

A most specific feature of the present invention is its ability to be interfaced with a number of present day computers by merely changing integral interface electronics in order to make the necessary adaptation. The reproducing or plotting capability of the electromechanical film handling system described hereinafter is such as to make it capable of accepting information as quickly as such information is presented from the computer. There is further described a film handling mechanism for rotating drum type reproducing machines which obviates the necessity to load and unload in darkened or partially darkened rooms. Furthermore, the film cartridge of the present invention is easily insertable onto and removable from the film carrying drum either in lighted or darkened rooms in a minimal amount of time and without fear of exposure. Once the cartridge is loaded and the reproducer actuated, the reproducing operation becomes essentially automatic, there being no necessity for the operator to do anything but unload the film cartridge upon completion of the reproducing or plotting operation. Still further, the film handling mechanism and cooperating film cartridge of the invention may be utilized in any number of applications such as, for example, the reproduction of engineering drawings, computer generated drafting displays, on-line information retrieval of digitally encoded data and alphanumeric, high-speed electronic printing. These and numerous other features and advantages of the present invention will become more clearly apparent upon a reading of the following detailed specification, claims, and drawings, wherein like numerals denote like parts in the several views and wherein:

Figure 1:
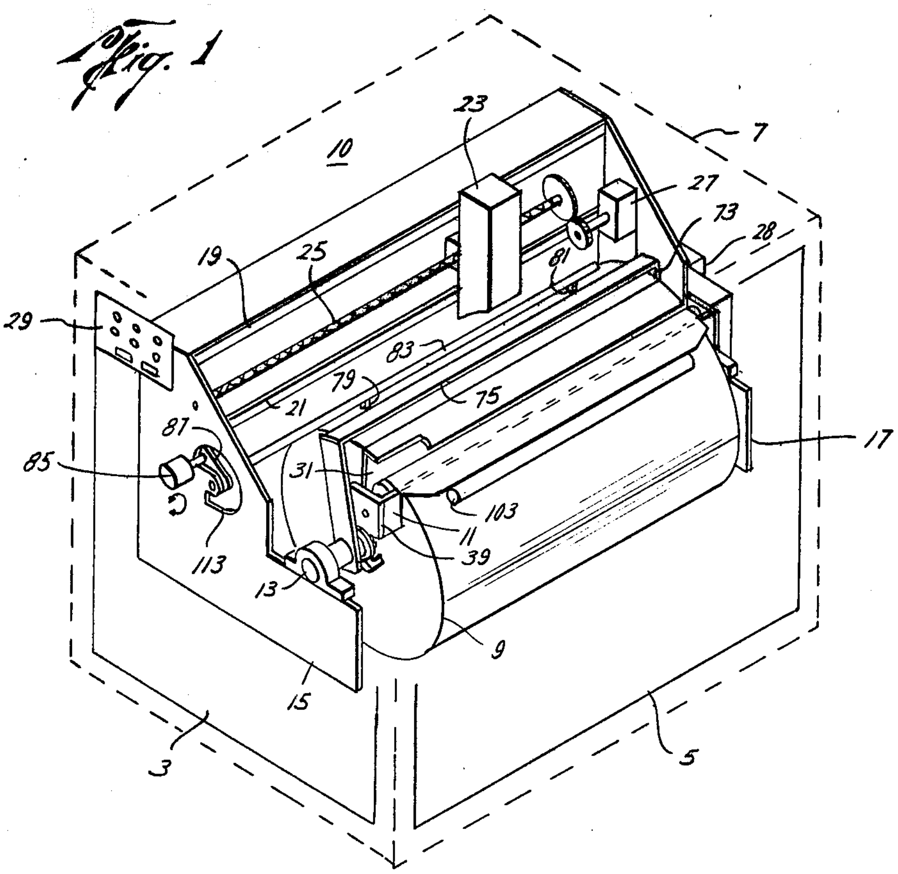
FIGURE 1 is an assembly view in oblique perspective of the image or facsimile reproducer of the invention showing the improved film handling mechanism and cartridge therein.

As best shown in FIGURE 1, the film handling mechanism is shown for exemplary purposes in an image reproducing machine of the type generally referred to as a data plotter. The plotter comprises the housing or cabinet 10, having a plurality of doors or openings 3, 5, and 7, so as to provide access to the interior wherein is located the data transcribing mechanism. This mechanism comprises the film transport drum 9 and associated magazine assembly 11, all supported rotatably on drum shaft 13. The drum shaft 13 is in turn supported upon the cabinet walls 15, 17 at the sides of the cabinet 7. Also supported on cabinet walls 15, 17 are the carriage rails 19, 21. Slidably affixed to the rails is a cathode ray tube 23 which serves as the data transducer means. The cathode ray tube is moved longitudinally of the drum 9 by means of a drive screw 25 which is in turn geared to prime drive motor 27. Microswitches (not shown) may be mounted on the carriage rails near the right and left ends thereof so as to prevent the cathode ray tube and an associated lens assembly from overrunning the maximum limits at each end. The lens associated with the cathode ray tube 23 is used to project the light radiated by the face of the tube onto the recording medium. A drum drive motor 28 is geared to the shaft of the plotting drum 9 and may be coordinated by means of a light sensor (not shown) with the cathode ray tube so as to provide synchronized movement of the latter with rotations of the drum. The drum drive motor as well as all other electrically actuated units of the assembly may be controlled from central panel 29 disposed in an appropriate position on an exterior face of the plotter cabinet.

Figure 3:
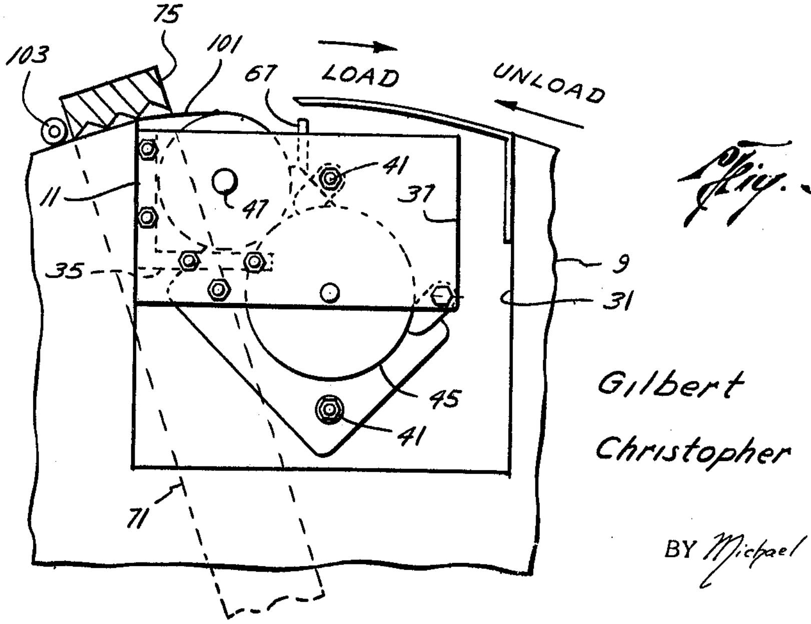
FIGURE 3 is a side elevation view of the magazine of FIGURE 2, showing its relation to the drum and to the tail latch assembly.

The plotting drum 9 has as its primary function the carrying of the recording medium or film in rotational manner before the cathode ray tube. The outer surface of the drum is covered with a smooth black material, such as Formica, and is characterized by a longitudinally extending rectangular recess or drum well 31 into which is fitted the magazine assembly 11 described hereinafter (see FIGURES 1 and 3).

Figure 2:
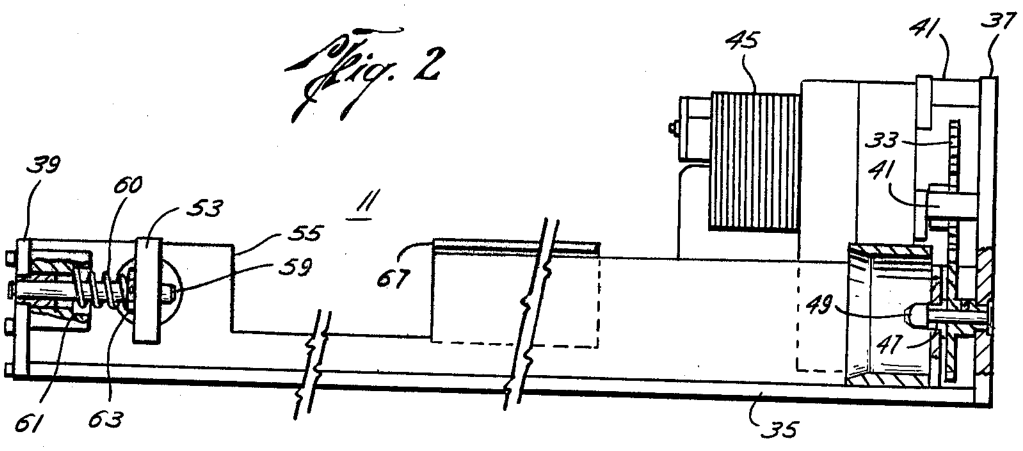
FIGURE 2 is a front elevation view of the magazine assembly as it appears when removed from the rotating drum illustrated in FIGURE 1.

The magazine assembly includes as a primary portion thereof, the magazine spool bracket 35 (FIGURE 2). The bracket 35 extends the length of drum well 31 and is affixed therein by appropriate means such as screws (not shown). Affixed respectively to each end of the magazine spool bracket 35 is the magazine motor plate 37 and the magazine spring plate 39. Perpendicularly extending from the magazine motor plate are a plurality of spacers 41 which provide operating room for gear train 33. A take up motor 45 is supported on spacers 41 and operatively connected to magazine drift shaft 47 through the aforementioned gear train 33. The magazine drift shaft 47 is characterized by a squared end 49 so as to provide driving engagement with a mating female portion in the cartridge mandrel described hereafter.

The opposite end of magazine assembly 11 is characterized by a bushing 53 supported on and extending from the bracket back wall 55. An aperture extends transversely through the spring plate 39 so as to receive therethrough the shaft 59. Axial loading of the bushing 53 is accomplished by means of the compressed coil spring 60. An appropriate bearing and bushing block surfaces 61 and 63 respectively may be provided about the shaft 59 so as to insure its fixed positioning on the magazine bracket 35. There is additionally provided along the back wall of the bracket 35 a tensioning bar 67, the purpose of which will be described hereafter with reference to the unloading operation of the magazine assembly.

Rotatably and frictionally supported on drum shaft 13 and at each end of the drum 9 is a tail latch support arm 71, 73 (see FIGURE 1). A tail latch member 75 is fixedly connected to each of the unsupported ends of the tail latch support arms to thus provide a swinging gate or tail latch assembly capable of rotatable movement about the drum 9. It is the function of the tail latch to engage a protruding leader tube (described hereafter) forming a stiff shoulder on the cylindrical film cartridge so that upon initiation of rotational movement of the drum, the film cartridge would unwind upon the drum due to the static holding force of the film end by the tail latch member. Upon complete unwinding or loading of the film cartridge onto the drum 9, the tail latch is pulled, by reason of its engagement to the film strip and associated leader tube, into engagement with the fingers 79, 81 of finger bar 83. The finger bar 83 does not however permit passage of the tail latch member thereunder until the film is completely unwound. When this occurs, an increased load is placed upon the fingers 79, 81 of the finger bar 83 by reason of the increased load on the tail latch member 75. The finger bar, which is counter-weighted as by cocking weight 85, is thus caused to be rotated out of position so as to permit passage of the tail latch member 75 thereunder. The fingers are thus rotated out of the sweep area of the tail latch and the tail latch, being frictionally loaded to the shaft of the plotting drum, continues to rotate wtih the drum and thus hold the photosensitive paper or film snugly therearound.

With reference to the finger bar 83 (and the fingers 79, 81) attached thereto, it may be noted with respect to FIGURE 1 that this element of structure is rotatably mounted on the aforementioned cabinet walls 15, 17 and counterbalanced in a normally counterclockwise position prior to initiation of the loading of the drum. This is accomplished by means of the weight 87 which is fixedly connected to the finger bar in a radially extending manner. The weight arm has at its remote end the aforementioned cocking weight 85 affixed thereto. It is thus seen that the finger bar serves the very substantial function of both permitting effective loading of the drum 9 and subsequently allowing passage of the tail latch 75 so as to maintain the recording medium or film sheet in firm engagement with the drum, as explained above.

Figure 4:
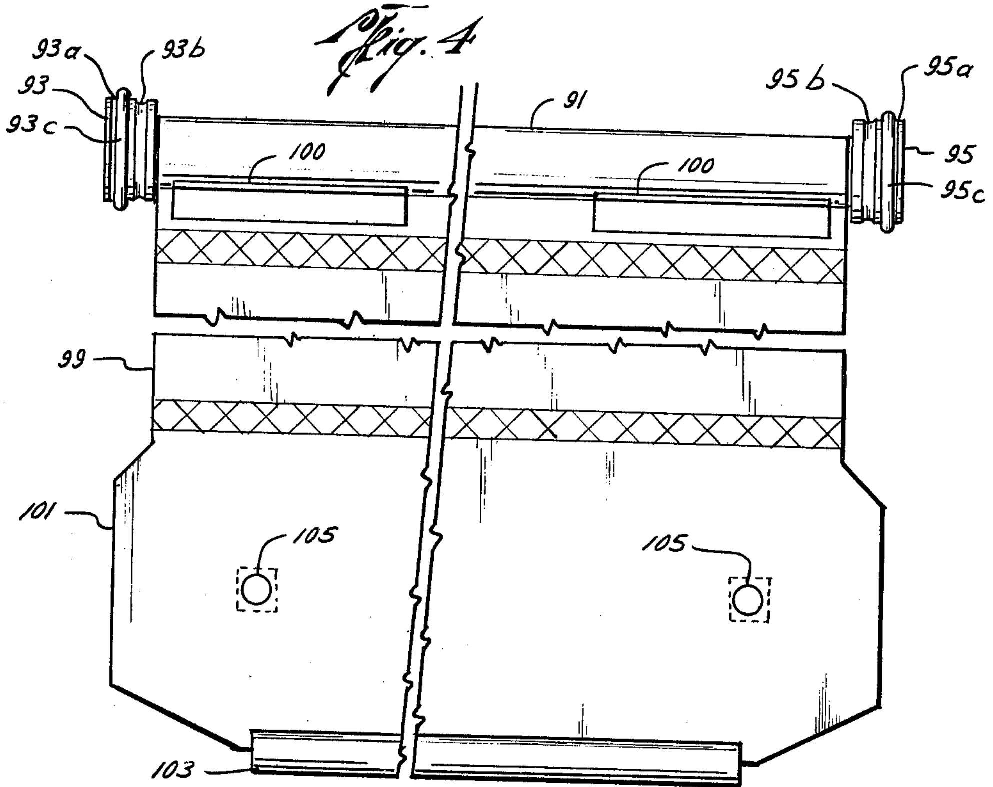
FIGURE 4 is a top view of the cartridge used in the reproducer of FIGURE 1 showing the film or other recording medium affixed thereto but in an unwound condition.
Figure 5:
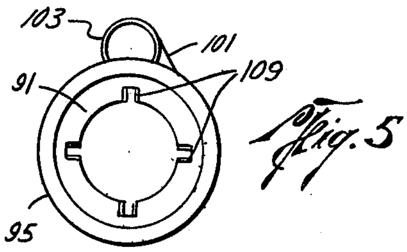
FIGURE 5 is an end view of the cartridge of FIGURE 4 showing the recording medium in wound condition thereon.

Reference may now be made to the film cartridge itself as best shown in FIGURES 4 and 5. The film cartridge is comprised of the elongated tubular body 91 which may, for example, be made of conventional helically wound cardboard or wood pulp composition and of such longitudinal dimensions as to cooperatively fit between the shafts 47, 59 of the magazine assembly. Affixed at each end of the tubular body 91 are end caps 93, 95 which may be made of plastic or similar materials. The end caps are each characterized by a pair of circumferentially adjacent grooves **93*a*, 93*b*, 95*a*, 95*b*, which are intended to receive a respective flexible O-ring of predetermined internal diameter and cross-sectional thickness. These O-rings 93*c* and 95*c* are each respectively maintained in their inner grooves 93*b*, 95*b* or their outer grooves 93*a*, and 95*a*, depending upon whether the light sensitive material or film 99 is desired to be insulated against any ambient exposure. It is noted that there exists a functional relationship insofar as the relative dimensions are concerned between the two grooves on each side of the cartridge tube. For example, the dimensional distance between grooves 95*b* and 95*a* shall be the equivalent of the circumferential dimension of the O-ring 95*c*. In this manner there is required a single rotational movement of a portion of the O-ring, such as by finger pressure, in order to accomplish equivalent circumferential engagement by the O-ring on each adjacent groove. The grooves 93*a* and 93*b* cooperate identically with the O-ring 93*c*. As shown in FIGURE 4, the width of the light sensitive paper or film 99 is somewhat less than that of the distance between the two end caps 93 and 95 so as to permit winding of the film on the cartridge spool. The film 99 is affixed to the cartridge spool by means of an inner leader 100 or interim connection such as adhesive type paper. The terminal or exterior end of the film spool is characterized by a long leader 101 which serves to seal the film portion against ambient light due to its wrapping about of the inner grooves 93*b*, 95*b* and by the subsequent rolling of O-rings 93*c* and 95*c* over the leader 101 and into engagement with the grooves therebeneath. It will be recognized therefore, that the internal diameter of the O-rings will be fractionally less than the cross-sectional diameter of the end caps at the grooved portions. In this manner a light-tight sealing structure arrangement is ensured. Fixedly attached to the longitudinal end of the long leader is a long leader tube 103. The leader tube serves to engage the tail latch member 75 upon loading of the film upon the drum 9. In this manner automatic loading of the drum is accomplished by merely emplacing the cartridge within the drum well and between the shafts 47, 59 of the magazine 33. Also, due to its physical size and shape, the leader tube 103 enhances handling under normal darkroom procedures by providing a relatively stiff means by which the film may be uniformly unrolled from the spool. Still further, the leader tube enhances darkroom and handling proceures while the film is in the development tank in that the tube floats on the surface, thus tending to buoy the leader into handling position. Also located on the interior surface of the long leader 101 are a plurality of adhesive spots 105 which additionally enhance the sealing capabilities of the cartridge when it is in the rolled up condition. In wrapping of the cartridge, the spots need only be depressed at some appropriate marking on the external surface of the leader in order to place them into effective sealing engagement with the adjacent leader roll. As most readily viewed in FIGURE 5, the ends of the cartridge tube are appropriately keyed as at 109 in order to engage a cooperating mandrel that fits within the cartridge assembly and which is in turn fitted to the squared drive shaft end 47 that is geared to motor 45**.

In operation of the film handling mechanism and improved cartridge structure of the invention, the appropriately sized cartridge structure is selected and positioned within the magazine assembly by depressing the spring loaded bushing 53 so as to permit insertion of the cartridge onto the shaft 47. The end of the cartridge adjacent the spring loaded shaft 59 is then aligned therewith and the spring force is permitted to bias the bushing and its respective shaft into engagement with the cartridge end cap. The long lead 101 is then pulled out of the cartridge by grasping the leader tube 103. The tail latch member 75 is pulled around to the top surface of the drum so that the leader tube is resting also on the surface of the drum adjacent to the tail latch member. The weighted trip bar or finger bar 83 is rotated to a counter-clockwise position (as viewed in FIGURE 1) so as to place the fingers 79, 81 in obstructing relationship to the tail latch member 75, thus preventing the rotation of the tail latch 75 with the drum during the unwinding or loading of the film onto the drum surface. Since the tail latch member 75 is secured to the drum in a frictional manner by the support arms 71, 73 the member 75 cannot rotate until the complete spool is unloaded onto the drum. The load button on control panel 29 of the cabinet may then be actuated so as to initiate counter-clockwise rotation of the drum and, in this manner, cause the film to unload upon the drum surface. The tail latch member 75 will, of course, rotate with the drum until it comes into contact with the fingers 79, 81. At that point, tail latch rotation is temporarily stopped, but the drum continues to rotate. The friction loading of the tail latch on the drum axle is not sufficient to allow the leading edge of the tail latch to cause the fingers to be rotated and thus throw the cocking weight in the clockwise direction so as to raise the fingers. However, when the paper and/or film has been fully extended around the drum, that is, after it has been completely unrolled from its spool with the short leader firmly attached to the spool itself, a load is abruptly placed on the tail latch member 75 by reason of the leader tube's 103 connection to the long leader of the film. This load in addition to the frictional load causes the tail latch member to rotate the fingers of the finger bar thus causing the finger bar to rotate in the clockwise direction and abruptly throwing the cocking weight 85 over the right-hand stop 113. The fingers are thus rotated out of the sweep area of the tail latch member and the member, being frictionally connected to the shaft of the plotting drum, continues to rotate with the drum and thus holding the recording medium (film) snugly therearound.

Upon completion of the plotting, the plotter operator depresses the unload pushbutton on the control panel of the cabinet. This causes the unload motor 45 to rotate counter-clockwise (as viewed in FIGURE 1) thus unwrapping the film from the plotting drum and rewinding it on the cartridge spool, the spool being driven by the shaft of the unload motor.

As the film is respooled by the unload motor, the tail latch member is pulled around the drum by the tube leader 103 until the latter reaches the aforementioned tension bar 67 at which time it becomes biased against said bar preventing further rotation of the shaft of the unload motor and automatically causing said motor to cut out. The operator may then simply reach into the cabinet, slip the O-rings over the respective ends of the cartridge, gently depress the adhesive spots on the long leader, release the spring-biased bushing 53, and remove the light sealed and moisture sealed cartridge from the plotter cabinet.

While a particular embodiment of the present invention has been shown and described, and while same has been shown and described with particular reference to a data plotter using a cathode ray tube source, it is apparent and should be recognized that numerous changes and modifications may be made herein, both with respect to the preferred embodiment of the invention and also with respect to the type of facsimile reproducing system with which it may be used without departing from the invention in its broader aspects.

That which is claimed and desired to be secured by Letters Patent of the United States is:

1. A data translating machine comprising in combination:
- a housing;
- a drum rotatably mounted in said housing;
- a member rotatably disposed within said drum;
- said member being formed of wrapped resilient material and defining at one end thereof a shoulder;
- said drum and said member being adapted for relative rotation; and
- latch means rotatably supported on said drum and having a latch member;
- said latch member being abuttingly positioned next to said shoulder for causing said material to unwrap from said member upon relative rotation in one direction between said drum and said latch means thereby loading said drum, and to wrap onto said member thereby unloading said drum when said relative rotation is in an opposite direction.

2. The combination of claim 1 and further including:
- a driving means operatively coupled to said drum and said member and being adapted to cause said relative rotation therebetween.

3. The combination of claim 2 and further including:
- movable trip means cooperatively mounted in said housing and adjacently disposed relative to said drum and said latch means,
- said trip means being adapted in one position to arrest the movement of said latch means relative to said drum during said loading of said drum.

4. A data transcribing machine for translating data to a recording medium comprising in combination:
- transducer means,
- a rotatably mounted drum disposed adjacent to said transducer means,
- a spool including a recording medium thereon,
  - said spool being removably and rotatably mounted within said drum,
- driving means connected to said drum and said spool and adapted to cause relative rotation therebetween,
- movable latching means rotatably supported on said drum to allow said spool to load said recording medium on said drum during a first operative mode of said driving means, whereby said transducer means can transcribe data onto said recording medium, and to allow said spool to unload the recording medium from said drum onto said spool during a second operative mode of said driving means.

5. The data translating machine as recited in claim 4 wherein said spool includes a substantially cylindrical body member for supporting said recording medium,
- first means coupling said recording medium to said body member,
- end means on each end of said body member, and
- second means attached to said recording medium to seal said recording medium to said end means.

References Cited

UNITED STATES PATENTS

| | | | |
|---|---|---|---|
| 2,170,505 | 8/1939 | Peters | 346—138 |
| 2,702,673 | 2/1955 | Steiner | 242—71.1 |
| 2,391,269 | 12/1945 | Philips | 96—78 |
| 2,726,919 | 12/1955 | Hathaway et al. | 346—110 |
| 3,130,931 | 4/1964 | Hautly | 242—55 |
| 3,234,024 | 2/1966 | Leinonen | 96—78 |

JOSEPH W. HARTARY, Primary Examiner

U.S. Cl. X.R.

96—78; 178—7.4; 346—110